United States Patent
Panzarella et al.

(10) Patent No.: US 10,069,295 B2
(45) Date of Patent: Sep. 4, 2018

(54) CONTROLLING GAMING MACHINE POWER-UP

(71) Applicant: Bally Gaming, Inc., Las Vegas, NV (US)

(72) Inventors: Russell C. Panzarella, Arlington Heights, IL (US); Sten H. Mejenborg, Cumming (DK); Scot W. Salzman, Buffalo Grove, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1074 days.

(21) Appl. No.: 14/231,102

(22) Filed: Mar. 31, 2014

(65) Prior Publication Data

US 2015/0276844 A1 Oct. 1, 2015

(51) Int. Cl.
*H02H 9/02* (2006.01)
*H02H 9/04* (2006.01)
*H02H 7/22* (2006.01)

(52) U.S. Cl.
CPC .................................... *H02H 7/22* (2013.01)

(58) Field of Classification Search
CPC ......... G06F 1/00; G06F 2101/00; H04L 1/00; H04L 2201/00; H02H 9/04; H02H 9/00; H02H 9/02
USPC .......................................................... 361/54
See application file for complete search history.

(56) References Cited

U.S. PATENT DOCUMENTS

| | | | |
|---|---|---|---|
| 4,948,138 A | 8/1990 | Pease et al. | 463/24 |
| 6,773,348 B2 | 8/2004 | Stockdale | 463/29 |
| 7,462,103 B2 | 12/2008 | Mattice et al. | 463/36 |
| 7,736,234 B2 | 6/2010 | Cockerille | 463/43 |
| 8,235,803 B2 | 8/2012 | Loose et al. | 463/25 |
| 8,262,464 B2 | 9/2012 | Canterbury et al. | 463/24 |
| 8,303,398 B2 | 11/2012 | Canterbury | 463/24 |
| 8,663,015 B2 | 3/2014 | Sylla et al. | 463/42 |
| 8,672,740 B2 | 3/2014 | Nicely | 463/21 |
| 8,672,741 B2 | 3/2014 | Nicely | 463/21 |
| 2004/0036273 A1* | 2/2004 | McClary | H01R 13/641 285/18 |
| 2008/0070652 A1 | 3/2008 | Nguyen et al. | 463/1 |
| 2009/0138133 A1 | 5/2009 | Buchholz et al. | 463/16 |

(Continued)

*Primary Examiner* — Dharti Patel
(74) *Attorney, Agent, or Firm* — David J. Bremer

(57) ABSTRACT

A gaming system includes circuitry and associated methodology for detection of continuity along one or more sensing paths for determination of the presence and proper seating of one or more component boards to each other and a backplane, having an arbitrary number of couplings. The invention controls voltage to one or more components of the gaming system, enabling selective activation of various components, on one or more of the connected boards, based on the proper seating of component boards to each other and a backplane. The invention implements dynamic configuration of sensing paths (defined by signal paths and signal traversal) and subsequent continuity detection through interfacing connector/port pairs, in combination with specifically placed electronic components and local ground connections along the sensing paths, to control powering selective system components based upon a detection of the presence and proper seating of multiple component boards to each other and a backplane.

19 Claims, 7 Drawing Sheets

(56) References Cited

U.S. PATENT DOCUMENTS

2010/0062833 A1    3/2010  Mattice et al. ................. 463/24
2012/0282997 A1   11/2012  Miner et al. .................... 463/25

\* cited by examiner

CONTROLLING GAMING MACHINE POWER-UP

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD OF THE INVENTION

The present invention relates generally to gaming apparatus and methods and, more particularly, to the use of electrical components and sensing paths to disallow component power up unless critical gaming component boards are properly seated in a backplane.

BACKGROUND OF THE INVENTION

Gaming machines, such as slot machines, video poker machines, and the like, have become increasingly more complex over the last few years, spanning a large variety of composite component and board arrangements, in addition to the modular addition of graphical, audio, gaming logic cards and boards, which may be connected by a common backplane. The presence of various boards and the state of proper connectivity is a topic of particular concern to gaming technicians. When boards are not present or properly seated, this may cause significant errors during the installation, configuration, and instantiation of various gaming equipment. Further, when a board (or physical electronic chip/module) is not properly seated or positioned, significant damage may occur when voltage is applied to the improperly seated component(s).

In modern gaming machines, it is routine for a common backplane to act as a conduit for connecting various component boards, such as a central processing unit (CPU) module board (housing one or more processing units and/or executing logic for equipment operation), gaming I/O board (s) (control of switches, lighting, non-volatile random access memory, etc.), communication boards (for information transfer to other electronic equipment), and memory devices (for enhanced digital storage capacity), to name a few. As more components and boards are introduced to the gaming system at large, there are inherent concerns with proper connectivity, compatibility, and overall system operation (and resultant component safety and integrity) when one or more of these components and boards are improperly seated or connected and voltage is applied to each component, board, and the system at large.

Therefore, there is an apparent need for technically simple, physical safeguards for gaming machines which regulate voltage to selective components based upon the connected status of other components, thereby protecting sensitive electronic components from receiving voltage when various components or boards are improperly seated or connected.

SUMMARY OF THE INVENTION

According to one embodiment of the invention, a gaming system operable to control voltage is disclosed. The gaming system comprises a backplane board having a power port configured for supplying power to one or more components of the gaming system and one or more additional ports, and a primary board comprising a power path coupled to the power port configured for supplying power to at least one primary board component on the primary board and one or more connectors configured to couple with a corresponding one of the one or more additional ports. The system further includes an electronic device controlling the flow of power through the power path. The system also includes a sensing path traversing the backplane board, the primary board (via the one or more additional ports), the electronic device, and a connection to ground of the primary board when the one or more additional port/connector pairs are properly coupled. The electronic device is deactivated to provide power to the at least one primary board component in response to all of the one or more connectors being fully seated in the corresponding one or more ports, and the electronic device is activated to shunt the power path to the ground of the primary board in response to any of one or more additional connectors being improperly coupled to the corresponding one or more ports.

According to another embodiment of the invention, a gaming system operable to control voltage is disclosed comprising a backplane board having a power port configured for supplying power to one or more components of the gaming system, one or more primary backplane ports on the backplane board, and one or more secondary backplane ports on the backplane board. The system includes a primary board having a power path configured for supplying power to at least one primary board component, one or more primary backplane connectors configured to couple with a corresponding one of the one or more primary backplane ports (each respective port and connector pair forming corresponding one or more primary backplane port/connector pairs), and a secondary port. The system further includes a secondary board having a secondary connector configured to couple with the secondary port (the secondary port and connector forming a second port/connector pair) and one or more secondary backplane connectors configured to couple with a corresponding one of the one or more secondary backplane ports (each respective secondary backplane port and secondary backplane connector forming corresponding one or more secondary backplane port/connector pairs). The system has a first electronic device controlling the flow of power through the power path, and a first sensing path traversing the backplane board and the primary board via the one or more primary backplane ports, the first electronic device, and connection to ground of the primary board. The first electronic device is deactivated to provide power to the at least one primary board component in response to all of the one or more primary backplane port/connector pairs being properly coupled, and the first electronic device is activated to shunt the power path to the ground of the primary board in response to any of the one or more primary backplane port/connector pairs as being improperly coupled.

According to another embodiment of the invention, a method of controlling voltage in a gaming system is disclosed, comprising establishing a power path for supplying power to one or more components on a circuit board of the gaming system or an electrical ground of the circuit board of the gaming system. The method further includes establishing a first sensing path comprising one or more first connectors and a corresponding number of one or more first ports (together forming corresponding one or more first port/connector pairs), and sending a first sensing signal via the first sensing path to determine whether all of the one or more first port/connector pairs are properly coupled.

Additional aspects of the invention will be apparent to those of ordinary skill in the art in view of the detailed description of various embodiments, which is made with reference to the drawings, a brief description of which is provided below.

Figure 1:
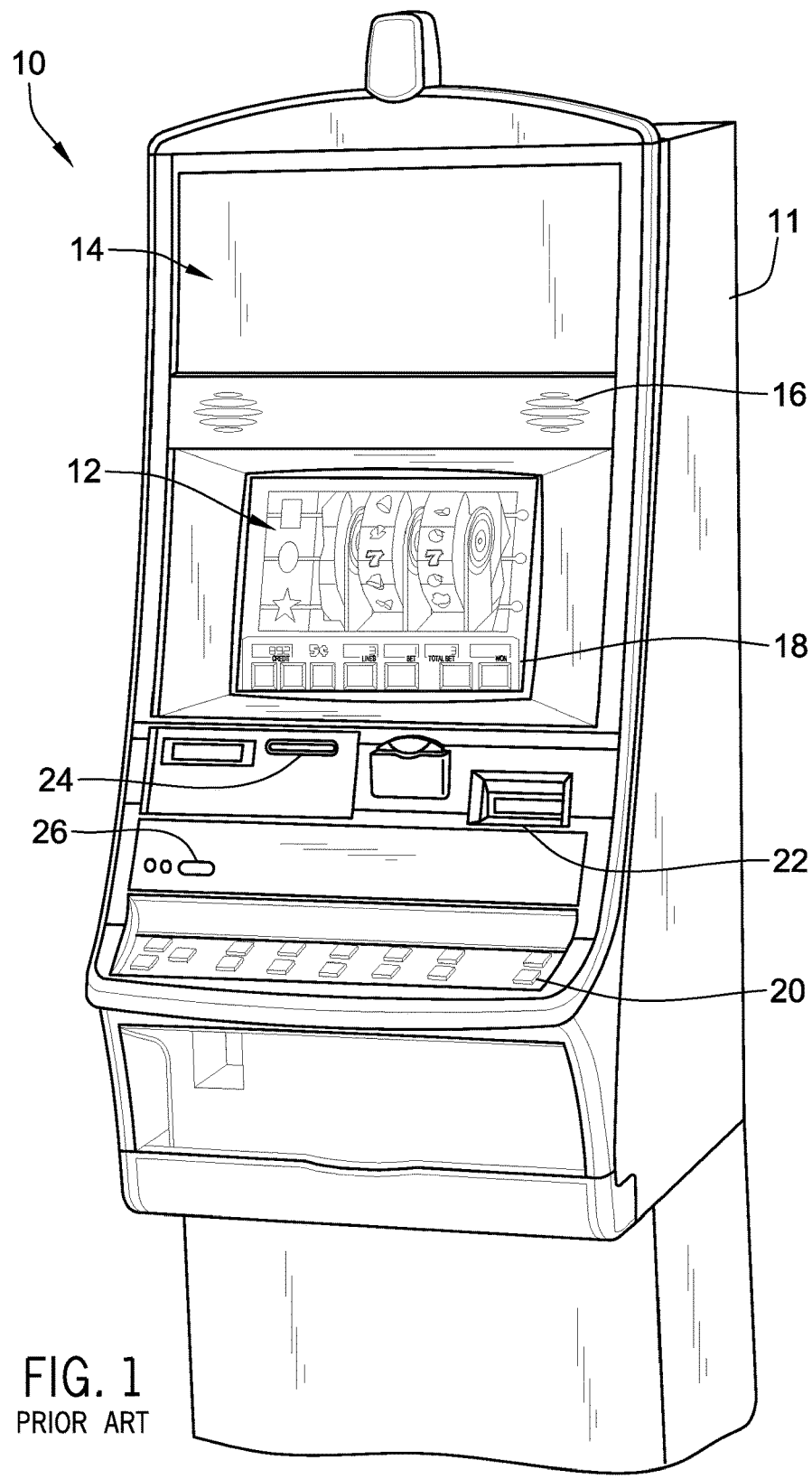
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

In modern gaming machines, it is routine for a common backplane to act as a conduit for connecting various component boards, such as a central processing unit (CPU) module board (housing one or more processing units and/or executing logic for equipment operation), gaming I/O board(s) (control of switches, lighting, non-volatile random access memory, etc.), communication boards (for information transfer to other electronic equipment), and memory devices (for enhanced digital storage capacity), to name a few.

Referring to FIG. 1, there is shown a gaming machine 10 similar to those used in gaming establishments, such as casinos. With regard to the present invention, the gaming machine 10 may be any type of gaming terminal or machine and may have varying structures and methods of operation. For example, in sonic aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in conducting wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a cabinet 11 that may house various input devices, output devices, and input/output devices. By way of example, the gaming machine 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc,). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a game-logic circuitry for processing. The electronic data signals are selected from a group consisting essentially of an electrical current, an electrical voltage, an electrical charge, an optical signal, an optical element, a magnetic signal, and a magnetic element.

Figure 2:
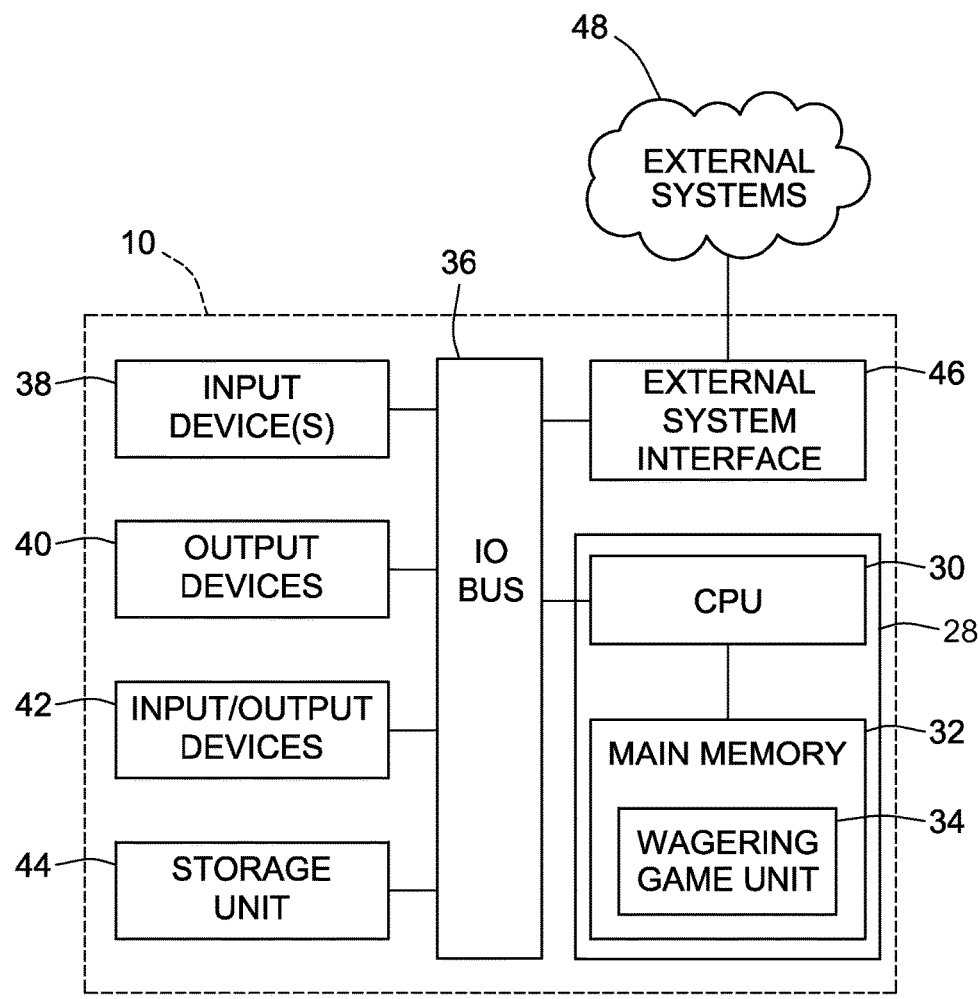
FIG. 2 is a schematic view of a gaming system according to an embodiment of the present invention.

Turning now to FIG. 2, there is shown a block diagram of the gaming-machine architecture. The gaming machine 10 includes game-logic circuitry 28 having a central processing unit (CPU) 30 connected to a main memory 32. The CPU 30 may include any suitable processor(s), such as those made by Intel and AMD. By way of example, the CPU 30 may include a plurality of microprocessors including a master processor, a slave processor, and a secondary or parallel, processor. Game-logic circuitry 28, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 28, and more specifically the CPU 30, comprises one or more controllers or processors and such one or more controllers or processors need not be disposed proximal to one another and may be located in different devices or in different locations. The game-logic circuitry 28, and more specifically the main memory 32, comprises one or more memory devices which need not be disposed proximal to one another and may be located in different devices or in different locations. The game-logic circuitry 28 is operable to execute all of the various gaming methods and other processes disclosed herein. The main memory 32 includes a wagering-game unit 34. In one embodiment, the wagering-game unit 34 may cause wagering games to be presented, such as video poker, video black jack, video slots, video lottery, etc., in whole or part.

The game-logic circuitry 28 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to a storage unit 44 and an external-system interface 46, which may be connected to external system(s) 48 (e.g., wagering-game networks).

The external system 48 includes, in various aspects, a gaming network, other gaming machines or terminals, a gaming, server, a remote controller, communications hardware, or a variety of other interfaced systems or components, in any combination. In yet other aspects, the external system 48 may comprise a player's portable electronic device (e.g., cellular phone, electronic, wallet, etc.) and the external-system interface 46 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 48 such that the gaming machine 10 operates as a thin, thick, or intermediate client. The game-logic circuitry 28—whether located within ("thick client"), external to ("thin client"), or distributed both within and external to ("intermediate client") the gaming machine 10—is utilized to provide a wagering game on the gaming machine 10. In general, the main memory 32 (comprising one or more memory devices) stores programming for an RNG, game-outcome logic, and game assets (e.g., art, sound, etc.). When a wagering-game instance is executed, the CPU 30 (comprising one or more processors or controllers) executes the RNG programming to generate one or more pseudo-random numbers. The pseudo-random numbers are utilized by the CPU 30 when executing the game-outcome logic to determine a resultant outcome for that instance of the wagering game. The resultant outcome is then presented to a player of the gaming machine 10 by accessing the associated game assets, required for the resultant outcome, from the main memory 32. The CPU 30 causes the game assets to be presented to the player as outputs from the gaming machine 10 (e.g., audio and video presentations).

The gaming machine 10 may include additional peripheral devices or more than one of each component shown in FIG. 2. Any component of the gaming-machine architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
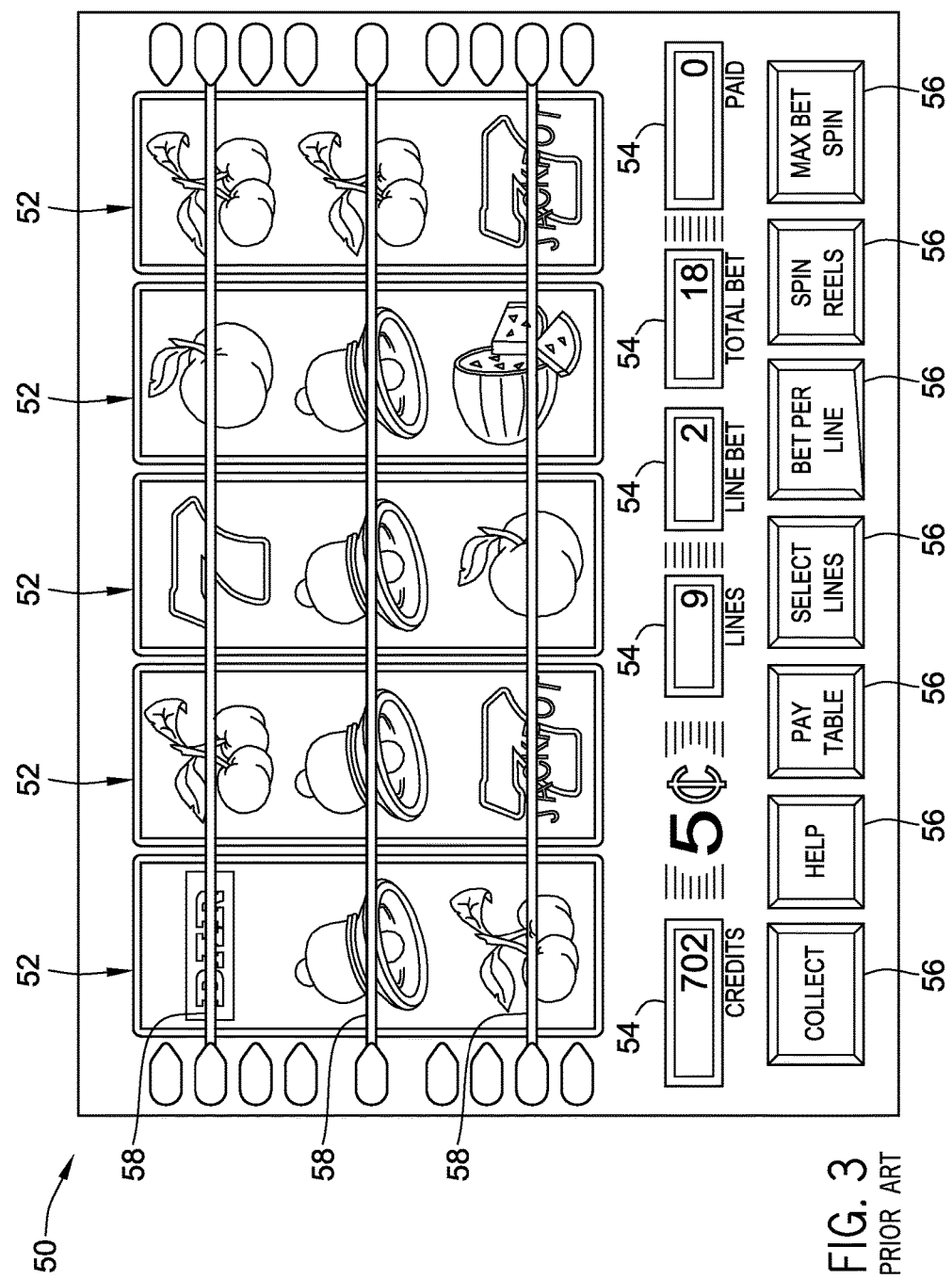
FIG. 3 is an image of an exemplary basic-game screen of a wagering game displayed on a gaming machine, according to an embodiment of the present invention.

Referring now to FIG. 3, there is illustrated an image of a basic-game screen 50 adapted to be displayed on the primary display area 12 or the secondary display area 14. The bask-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The game-logic circuitry 28 operates to execute a wagering-game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 12 or secondary display 14) through the display of information such as, but not limited to, text, graphics, static images, moving images, etc., or any combination thereof. In accord with the method of conducting the wagering game, the game-logic circuitry 28 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 28 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 30 causes the recording of a digital representation of the wager in one or more storage media (e.g., storage unit 44), the CPU 30, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU 30 (e.g., the wager in the present example). As another example, the CPU 30 further, in accord with the execution of the stored instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 28 to determine the outcome of the wagering-game instance. In at least some aspects, the game-logic circuitry is configured to determine an outcome of the wagering-game instance at least partially in response to the random parameter.

Figure 4:
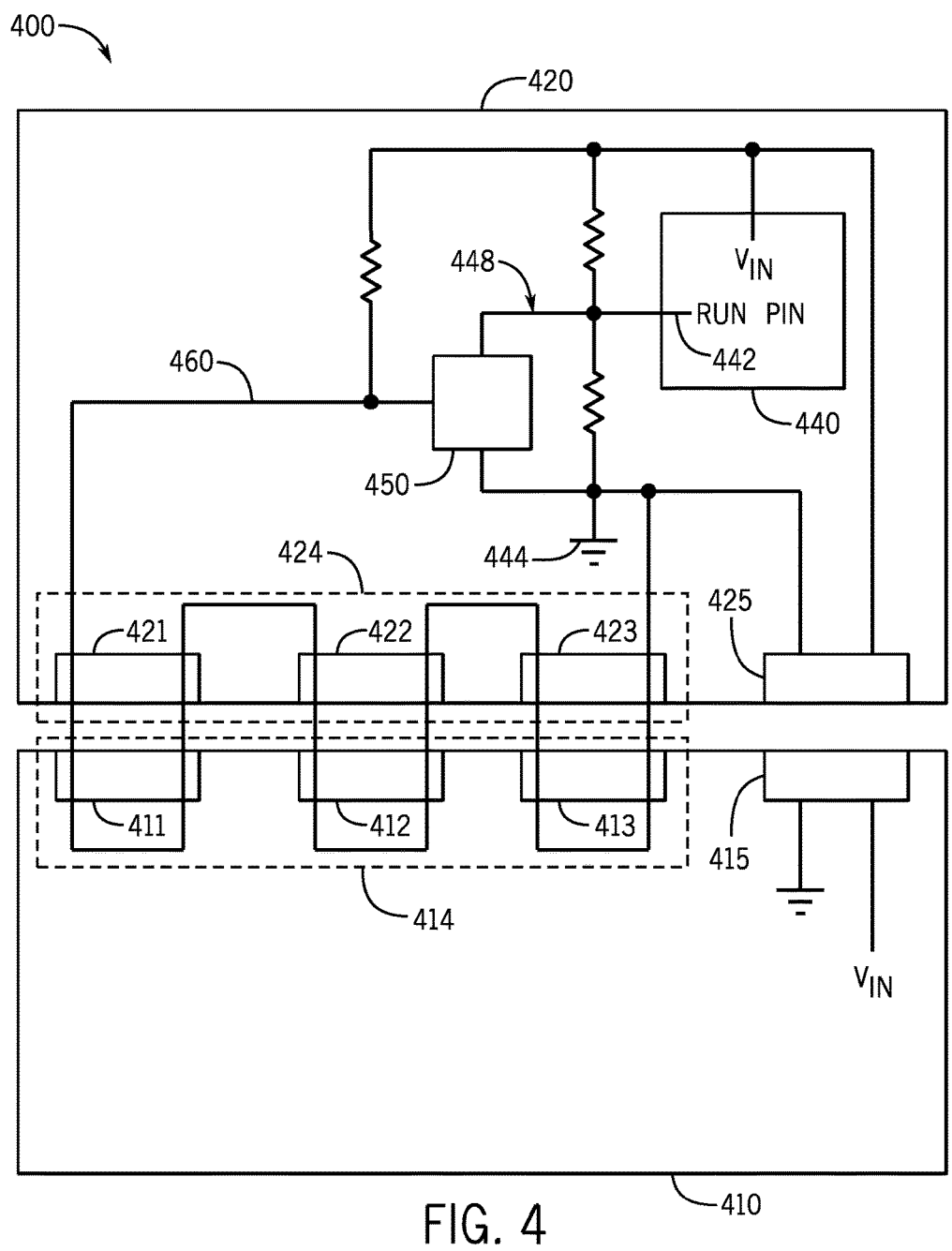
FIG. 4 is a schematic view of a gaming system containing circuitry for detecting properly seated boards and mated connectors between a CPU baseboard and a backplane according to an embodiment of the present invention.

Referring now to FIG. 4, a schematic is shown which details one embodiment of the present invention, describing hardware sensing circuitry for use in a gaming system which detects whether designated port/connector pair(s) of the gaming system are properly coupled (i.e., fully seated) to a backplane prior to supplying voltage to a set of given system component(s).

As will be appreciated by those skilled in the art, a variety of differing embodiments (including different port/connector purposes and system component combinations) that are reasonably and logically equivalent are intended to be included in the present description of the invention in each of the embodiments. This includes the provision for a given system board to have any configuration or number of connective devices to transfer data signals and/or voltage to other connected board(s). There is no limitation as to whether one or more boards specifically require a particular type of port or connector, nor a specific number or type of ports or connectors, or port/connector pair(s). Rather, all the boards are preferably configured to be connectively coupled to other boards and components in a predictable, compatible, and physically and electrically secure fashion.

In the current written description, the term "port/connector pair" or "port/connector pair(s)" appears often, and corresponds to intentionally mating port and connector components which may or may not be actively coupled. Each matching (mating) port and connector may be jointly characterized as a corresponding port/connector pair. In this embodiment, the components which make up each of the port/connector pair(s) which connect the primary baseboard and the backplane are individually called primary backplane connectors and primary backplane ports, but any one of each of these matching sets of components may be considered to form "one of the one or more primary backplane pair(s)". It should be clear that the designation of a port/connector pair simply reflects that the port component and the connector component of the port/connector pair are designed to be properly coupled, and this does not imply that they actually are properly coupled. This naming convention simply provides a way for matching pairs of coupling components to be specified together as an atomic unit without the express recitation of both individual components separately.

In one embodiment, gaming system 400 is functionally equivalent to gaming machine 10, referring back to FIG. 2. In other embodiments, gaming system 10 contains the entirety of components described for gaming system 400 in reference to FIG. 4. Gaming system 400 may comprise any combination of components or subset of components of gaming system 10 as described in detail in FIG. 2, in addition to other component(s) which may be physically, functionally, and decoratively similar or distinctive. Further, functional operation of specific boards and specific component(s) of both gaming system 10 and gaming system 400 may be distinct in both physical implementation and position. That is, there is no requirement that a functional piece of circuitry is bound to be located on a particular board, or in a particular location of a board, of either gaming machine 10 or gaming system 400.

In the current embodiment, gaming system 400 includes backplane 410 which serves to transfer information and signal flow between connected system boards and components, translating communication/signaling protocols as needed, and primary baseboard 420 hosts various hardware and/or software components of the gaming system 400 (for example, one or more central processing units, operating system logic, and game specific logic/circuitry, not shown).

Likewise, there is no requirement for a particular board to be bound to a particular set of functional processes or procedures. For example, in some embodiments, backplane 410 acts identically to input/output (I/O) bus 36. In other embodiments, backplane 410 may include functional elements which accompany various conduit(s) for information signal flow between board(s) and component(s), where such functional elements may modify or substitute some or all of the information signal flow between board(s). In one embodiment, primary baseboard 420 is functionally equivalent to game logic circuitry 28. In other embodiments, primary baseboard 420 comprises only central processing unit 30 and must externally connect to main memory 32 via wired or wireless connection to obtain programmatic instruction and/or data. In other embodiments, primary baseboard 420 contains volatile or non-volatile memory (logically and functionally equivalent to main memory 32 or storage unit 44) without specific processing or programmatic enablement. Any or all specifics of these various embodiments do not depart from the intended scope of the invention, as a skilled artisan can envision a number of different combinations of board(s) and functional operations given the present disclosure.

In one embodiment, backplane 410 is a completely passive conduit for information and voltage flow, primary baseboard 420 is a full-fledged combined central processing unit and storage module complete with processors, memory, logic, video and audio storage and generation circuitry including media codec(s), peripheral interfaces and input processing, and communication interfaces, etc. In another embodiment, backplane 410 may have enhanced functionality which may include processing offloaded from primary baseboard 420, or additional functionality not presently discussed.

When gaming system 400 is fully assembled and configured, backplane 410 and primary baseboard 420 are coupled using a set of distinct port/connector pairs for exchange of signal information. These port/connector pairs include pair 411/421 (for example, for transfer of gaming input/output information), port/connector pair 412/422 (for example, for CPU input/output), port/connector pair 413/423 (for example, for display port interfaces), and port/connector pair 415/425 (for supplying power). Each pair (set) of respective ports and connectors are specifically designed to properly couple together; that is, a given port (for example, port 412) is configured to couple with a respective connector (in this case, connector 422), which is specifically designed to match the port precisely to enable signal and voltage transfer through the port/connector pair.

Primary baseboard 420 additionally includes a local primary board ground 444, from which certain voltages on primary baseboard 420 are relatively measured. Primary baseboard 420 also includes controller 440 which receives power via $V_{in}$ pin coupled to power port/connector pair 415/425, and supplies power to various components of primary baseboard 420. While port/connector pair 415/425 provides power to the primary board as a whole (including controller 440 via $V_{in}$ pin), electrical power is further controlled for distribution to specific board components (not shown) positioned on primary baseboard 420 via controller 440. In other embodiments, controller 440 may control power flow to various system components which may or may not be specifically situated on primary baseboard 420.

Controller 440 is activated and deactivated by the amount of voltage being delivered to RUN pin 442 of controller 440. When RUN pin 442 voltage drops below a predetermined level, controller 440 turns off and does not supply power to various components (not shown) on primary baseboard 420. Alternatively, when RUN pin 442 voltage exceeds a predetermined level, controller 440 turns on and supplies power to various connected components (not shown) which are coupled to controller 440. These components may be present both on and off primary baseboard 420.

An electronic device 450 is coupled to RUN pin 442 of controller 440, and is further coupled to sensing path 460. Sensing path 460 traverses each of the port and connector pairs (411/421, 412/422, 413/423) which are subsequently monitored for proper seating in this embodiment. It is worth noting that the power port/connector pair 415/425 is not actively monitored for proper seating, because power would not be supplied to primary baseboard 420 (and associated components) if there exists a misalignment of this connector and port pair.

Sensing path 460 uses connective pins and receiving socket receptors (not shown) in each of the port/connector pairs (for example, 411/421, 412/422, 413/423) to send and receive signals which traverse the respective ports and connector pairs when sensing path 460 is continuous (unbroken). The use of differing types of connectors does not depart from the spirit of the invention, as an artisan skilled in the art would readily recognize. Electronic device 450 controls voltage applied to RUN pin 442 via power path 448, alternating operation between shunting voltage on power path 448 to primary board ground 444 or applying voltage on power path 448 to RUN pin 442, based upon the continuity of sensing path 460 and the resulting voltage at the various terminals of electronic component 450. For example, in the event that sensing path 460 is not continuous (i.e., sensing path 460 is broken) as a result of a misalignment or improper coupling of any port/connector pair along sensing path 460 (for example, port/connector pair 412/422), the lack of signal flow through sensing path 460 causes electronic device 450 to activate and shunt RUN pin 442 to primary board ground 444. Alternatively, in the event that sensing path 460 is unbroken (that is, there are no misaligned or improperly seated board interfaces along sensing path 460), electronic component 450 deactivates, and resultant voltage is delivered to RUN pin 442 via power path 448, activating controller 440 to supply power to various components (not shown) of primary board 420.

In this embodiment, electronic device 450 is preferably a transistor, specifically, a field effect transistor (FET), acting to shunt RUN pin 442 voltage to primary board ground 444 when sensing path 460 lacks continuity (i.e., is broken), consequently deactivating power to components of the primary board 420 when one or more port/connector pair(s) (i.e., boards or interfaces) are not properly coupled or seated. Other types of electronic components may be equally applicable to achieve these ends, including a vacuum or electron tube, an electronic switch, logic, gate(s), a metal-oxide-semiconductor field-effect transistor (MOSFET), etc. The present invention should not be limited to a particular type of electronic component used to achieve this type of configuration. Beneficially, the system automatically detects whether sensing path 460 is continuous or not, protecting primary board components from receiving power when the board interfaces (i.e., ports/connectors) are improperly coupled or seated.

In a slightly different embodiment, port/connector pair elements 411, 412, and 413, may be logically considered a single primary board port/connector 414, while port/connector pair elements 421, 422, and 423, may be logically considered a single secondary board port/connector 424, provided sensing path 460 is configured to traverse all the port/connector pairs which comprise port/connector pair 414/424. Alternatively, a single port/connector pair 414/424 may comprise any number of constituent port/connector pairs, again provided that sensing path 460 is configured to traverse all the constituent port/connector pairs. Further, sensing path 460 can take on any number of other configurations, including bidirectional traversal of all the port/connector pairs (not shown), or bidirectional traversal of only a single port/connector pair (as shown). All these configuration alternatives do not depart from the spirit of the invention given this disclosure, enabling an artisan to realize any or all combinations of these configuration varieties.

In many other configurations, gaming systems may have more than a single board, wherein each board may have multiple interfaces to multiple other boards, each of which may be improperly coupled or simply not coupled at all. Other embodiments of the present invention are useful for protecting sensitive components from being improperly powered, potentially due to the improper coupling of any one of a number of connective conduits, on any one of a number of connected boards.

In one embodiment, sensing circuitry is described which detects proper seating of components and boards through the use of multiple sense pins along one or more sensing paths used to effect transistors to enable or disable particular electronic components from receiving voltage. Once these sense pins are fully (properly) mated, the invention enables a local power supply on a central processing unit module board (for example, game-logic circuitry 28 or primary baseboard 420) to activate and deliver power to other electronic components. However, if the central processing unit module board is not properly seated, or if other connected boards or components are improperly seated, the central processing board power supply module will stay powered off to protect components from receiving potentially damaging current. The disclosed sensing circuitry is further capable to detect the presence of a particular board (for example, a gaming I/O card, as described above) by determining if an established sensing path through the port connecting the board is continuous or not, and alternatively combine this determination with other sensing paths to enable selective powering of components based on the proper seating of critical boards in the absence of non-critical boards. This configuration results in routing and rerouting of sensing path(s) based on the activation and deactivation of electronic components which respond to the state of the sensing path(s).

Figure 5:
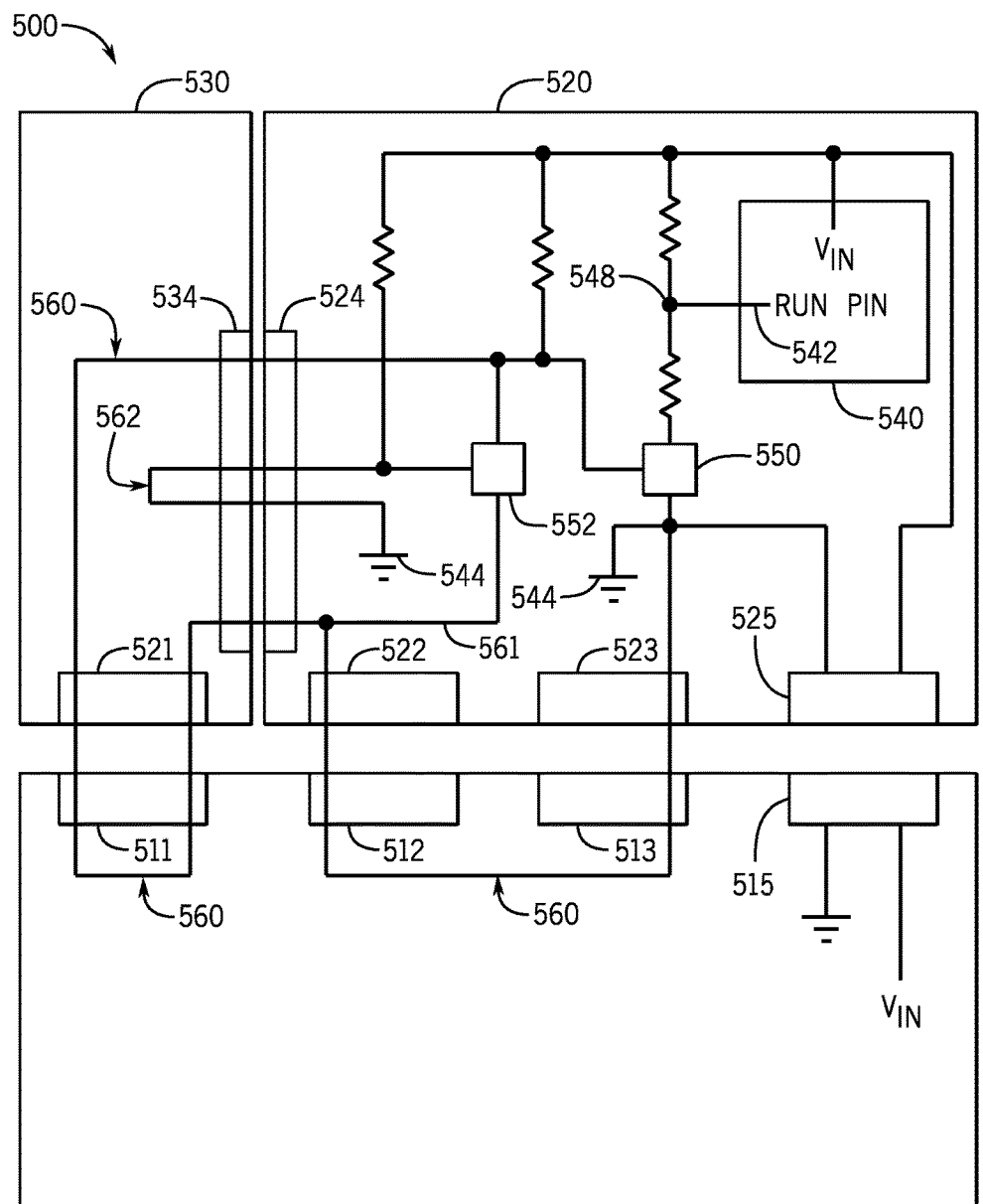
FIG. 5 is a schematic view of a gaming system containing sensing circuitry for detecting properly seated boards and mated connectors between a backplane, and multiple component boards according to another embodiment of the present invention.

Referring now to FIG. 5, a schematic is shown which details another embodiment of the invention describing a hardware sensing circuit for a gaming system which detects whether designated port/connector pair(s) of multiple boards of the gaming system are properly coupled to a backplane, prior to supplying voltage to a set of given system component(s). Additionally, this embodiment also detects whether multiple boards of the gaming system are properly coupled to each other; this removes the requirement for proper coupling of secondary, non-connected boards to the backplane prior to supplying voltage to the set of given system component(s).

That is, in this embodiment of the invention, a hardware sensing circuit for a gaming system detects whether a primary board is connected to a secondary board, and determines the state of various port/connector pair(s) of both the primary and secondary board being properly seated to a backplane prior to supplying voltage to a given system component, and in the event that the secondary board is not connected to the primary board, it is still possible that the given system component(s) receive power, depending upon the proper connection state of the entirety of the primary board backplane port/connector pairs.

In one embodiment, gaming system 500 is functionally equivalent to gaming machine 10, referring back to FIG. 2. In other embodiments, gaming system 10 contains the entirety of components described for gaming system 500 in reference to FIG. 5. Gaming system 500 may comprise any combination of components or subset of components of gaming system 10 as described in detail in FIG. 2, in addition to other component(s) which may be physically, functionally, and decoratively similar or distinctive. Further, functional operation of specific boards and specific component(s) of both gaming system 10 and gaming system 500 may be distinct in both physical implementation and position, both logically and physically. That is, there is no requirement that a functional piece of circuitry is bound to be located on a particular board, or in a particular location of a board, of either gaming machine 10 or gaming system 500, nor is a particular board of either gaming machine 10 or gaming system 500 required to be positioned or physically connected specifically as shown.

Likewise, there is no requirement for a particular board to be bound to a particular set of functional processes or procedures. For example, in some embodiments, backplane 510 acts identically to input/output (I/O) bus 36. In other embodiments, backplane 510 may include functional elements which accompany various conduit(s) for information signal flow between board(s) and component(s), where such functional elements may modify or substitute some or all of the information signal flow between board(s). In one embodiment, primary board 520 is functionally equivalent to game logic circuitry 28. In other embodiments, primary board 520 comprises only central processing unit 30 and must externally connect to main memory 32 via wired or wireless connection to obtain programmatic instruction and/or data. In other embodiments, primary board 520 contains volatile or non-volatile memory (logically and functionally equivalent to main memory 32 or storage unit 44) without specific processing or programmatic enablement. Secondary board 530 may include any or all of the preceding functional and/or structural form of the primary board; that is, processing which may typically be considered to be performed by primary board 520 may be reasonably offloaded to secondary board 530. Further, secondary board 530 may be larger, have many more functions, and be significantly more powerful than primary board 520. Any or all specifics of these various embodiments do not depart from the intended scope of the invention, as a skilled artisan can envision a number of different combinations of board(s) and functional operation given the present disclosure.

In one embodiment, backplane 510 is a passive conduit for information and voltage flow, primary board 520 is a multi-functioned central processing unit and storage module complete with processors, memory, logic, video and audio storage and generation circuitry including media codec(s), peripheral interfaces and input processing, and communication interfaces, etc. Secondary board 530 may include various other functions of the gaming system 500 not performed by primary board 520, including generation and control of secondary sounds or noises, video display for an additional external display device, external or internal lighting, lighting of input/output devices, visual or physical control of switches, extended audio and/or video information storage, etc. Any or all of these functions may impact the experience of the gaming user using gaming machine 10 or gaming, system 500, including ambient or decorative lighting of the various system devices (e.g., speakers 16, touch screen(s) 18, buttons 20, bill validator 22, information reader/writer(s) 24, player-accessible port(s) 26, etc.).

In the present embodiment, gaming system 500 includes backplane 510 which serves to transfer information and signal flow between connected system components translating communication/signaling protocols as needed, primary board 520 which hosts various hardware and/or software components of gaming system 500 (for example, one or more central processing units, operating system logic, and game specific logic/circuitry, not shown), and a secondary board 530 (for example, for control of switches, lighting, and access to extended memory segments, etc.). When gaming system 500 is fully assembled and configured, secondary board 530 connects to port 524 of primary board 520 via connector 534 (for example, for data transfer or process offloading), secondary board connects to port 511 of backplane 510 via connector 521 (e.g., for transfer of gaming input/output information), and primary board 520 and backplane 510 interface through port/connector pairs for exchange of signal information, including port/connector pair 512/522 (e.g., for CPU input/output), port/connector pair 513/523 (e.g., for display port interfaces), and port/connector pair 515/525 (for power).

In another embodiment, the port/connector pairs which connect the primary board and the backplane are called primary backplane connectors and primary backplane ports, and the port/connector pairs winch connect the secondary board and the backplane are called secondary backplane connectors and secondary backplane ports. Further, the port/connector pairs which connect the primary board to the secondary board are called a secondary port/connector, since the constituent port/connector couples a secondary board to a primary board via this port/connector pair. Parallel to the potential for multiple port/connector pairs to exist between a primary board or a secondary board coupled to a backplane board, it is also possible for multiple port/connector pairs to exist between a primary and secondary board.

As above, each set (pair) of respective ports and connectors are specifically designed to couple together; that is, a given port (tor example, port 512) is configured to couple with a respective connector (in this case, connector 522), which is specifically designed to match the port precisely to enable signal and voltage transfer through the port/connector pair. As will be appreciated by those skilled in the art, a variety of differing embodiments (including different port/connector purposes and system component combinations), which are reasonably and logically equivalent are intended to be included in the present description.

As will also be appreciated by those skilled in the art, a variety of differing embodiments (including different port/connector purposes and system component combinations), which are reasonably and logically equivalent are intended to be included in the present description. This includes the provision for a given board to have any configuration or number of connective devices to transfer data signals and/or voltage to other connected board(s). There is no limitation as to whether a board (or boards) specifically requires a particular type of port or connector, nor a specific number of ports or connectors; what is important is that all the boards are configured to be connectively coupled to other boards and components in a predictable, compatible, and secure fashion.

Primary board 520 additionally includes a local primary board ground 544, from which certain voltages on the primary board are relatively measured. Primary board 520 also includes controller 540 which receives power via $V_{in}$ pin coupled to power port/connector pair 415/425, and supplies power to various components (not shown) of primary board 520. While port/connector pair 515/525 provides power to the primary board as a whole (including controller 540 via $V_{in}$ pin), electrical power is further controlled for distribution to specific board components positioned on primary board 520 (not shown) via controller 540. In other embodiments, controller 540 may control power flow to various system components which may or may not be specifically situated on primary board 520.

Controller 540 is activated and deactivated by various levels of voltage delivered to RUN pin 542. When RUN pin 542 voltage drops below a predetermined level, controller 540 turns off and does not supply power to various components (not shown) on primary board 520. Alternatively, when RUN pin 542 voltage exceeds a predetermined level, controller 540 turns on and supplies power to the various connected components (not shown) on primary board 520.

Electronic component 550 is coupled to RUN pin 542 of controller 540, and is further coupled to sensing path 560 which traverses each of the port and connector pairs (511/521, 512/522, 513/523, 524/534) which are subsequently monitored for proper coupling/connection in this embodiment. In the event that sensing path 560 is continuous and entirely unbroken (that is, there are no misaligned or improperly coupled or connected board interfaces along sensing path 560), electronic component 550 deactivates, and voltage is delivered to RUN pin 542 via power path 548, activating controller 540 to supply power to components (not shown) of primary board 520. The power port/connector pair (515 and 525) is not actively monitored for proper seating, since power would not be supplied to the primary board 520 when a misalignment of this pair occurs.

Sensing paths 560, 561, and 562 comprise a combination of connective pins and receiving socket pins/receptors (not shown) in each of the respective port/connector pairs (511/521, 512/522, 513/523, 524/534). Connective pins (not shown) are used to send and receive signals which traverse the respective port/connector pairs when sensing paths 560, 561, and 562 are continuous (i.e., unbroken). Electronic component 550 controls voltage applied to power path 548 and RUN pin 542, alternating operation between shunting voltage to primary board ground 544 and applying voltage to RUN pin 542 via power path 548, based upon the combination of the continuity of sensing path 560, continuity of sensing path 561, and continuity of sensing path 562. The state of the continuity of each of the sensing paths 560, 561, and 562 impact the resulting voltage at the various terminals of electronic component 550.

In the event that sensing path 560 is not continuous, (i.e., broken) as a result of a misalignment of one or more port/connector pairs (for example pair 511/521), the lack of signal flow through sensing path 560 causes electronic component 550 to activate, thereby shunting RUN pin 542 to CPU board ground 544. Additional port/connector pairs 512/522 and 513/523 may also directly impact the state of electronic component 550; if any of these port/connector pairs are misaligned or improperly coupled, electronic component 550 activates, shunting RUN pin 542 to primary board ground 544, deactivating controller 540.

In this multiple board configuration, there is the potential for secondary board 530 to be either improperly coupled (via connector/pair 511/521), or to be completely absent from the configuration. The current embodiment functions to provide dual protection of primary board components (not shown)

from improper powering given the presence or absence of secondary board 530 by utilizing an additional sensing path 562 which determines directly whether secondary board 530 is connected (i.e., properly coupled) to primary board 520 via port/connector pair 524/534.

Electronic component 552 is coupled directly to sensing path 560 (and resultantly, electronic device 550), so sensing path 560 is intrinsically intertwined with sensing path 562. When sensing path 562 detects that secondary board 530 is not properly connected to primary board 520, electronic device 552 is activated, and sensing path 560 is routed to bypass the secondary board sensing path 562 entirely, via sensing path 561. Thus, when secondary board 530 is not connected to primary board 520, routed sensing path 560/561 dually serves to enable detection of proper seating of port/connector pairs 512/522 and 513/523, enabling electronic component 550 to activate RUN pin 542 voltage and controller 540 via power path 548, with or without the presence of secondary board 530.

In other words, when sensing path 562 detects that secondary board 530 is properly coupled to primary board 520, electronic component 552 is deactivated, and (unbroken) sensing path 562 loops back signaling through port/connector pair 524/534, shunting to primary board ground 544; a "loopback" of the sensing signal occurs when the sensing signal arrives at secondary board 530 via port/connector pair 524/534, and returns to primary board 520 via the same port/connection pair. This enables detection of the attachment of the secondary board (and a resultant defining of sensing path 560), which is distinct from the use of sensing path 561 (as a portion of sensing path 560) when the secondary board 530 is absent from the configuration. This greatly improves overall system operation and protection of primary board 520 components, since primary board 520 components (not shown) may receive power from controller 540, with or without secondary board 530, provided that all remaining port/connector pairs are properly coupled.

In this embodiment, electronic devices 550 and 552 are preferably transistors, specifically, field effect transistors (FETs), which collectively act to shunt RUN pin 542 voltage to CPU board ground 544 when sensing paths 560, 561, and/or 562 lack continuity. This results in the deactivation of power to components (not shown) of the primary board 520 when one or more critical ports/connector pairs are not properly coupled. More importantly, activation of power to components (not shown) of primary board 520 may be realized, even in the absence of secondary board 530. The modified system as described automatically detects whether sensing paths 560, 561, and 562 are continuous or not, protecting primary board 520 components (not shown) from receiving power when various board interfaces (i.e., ports/connectors) are not properly seated.

One skilled in the art can recognize that there is no requirement for electronic device 550 and 552 to be a specific type of transistor; other types of electronic components may be equally applicable to achieve these ends, including a vacuum or electron tube, an electronic switch, logic gate(s), a metal-oxide-semiconductor field-effect transistor (MOSFET), etc. The present invention should not be limited to a particular type of electronic component used to achieve this type of configuration.

Figure 6:
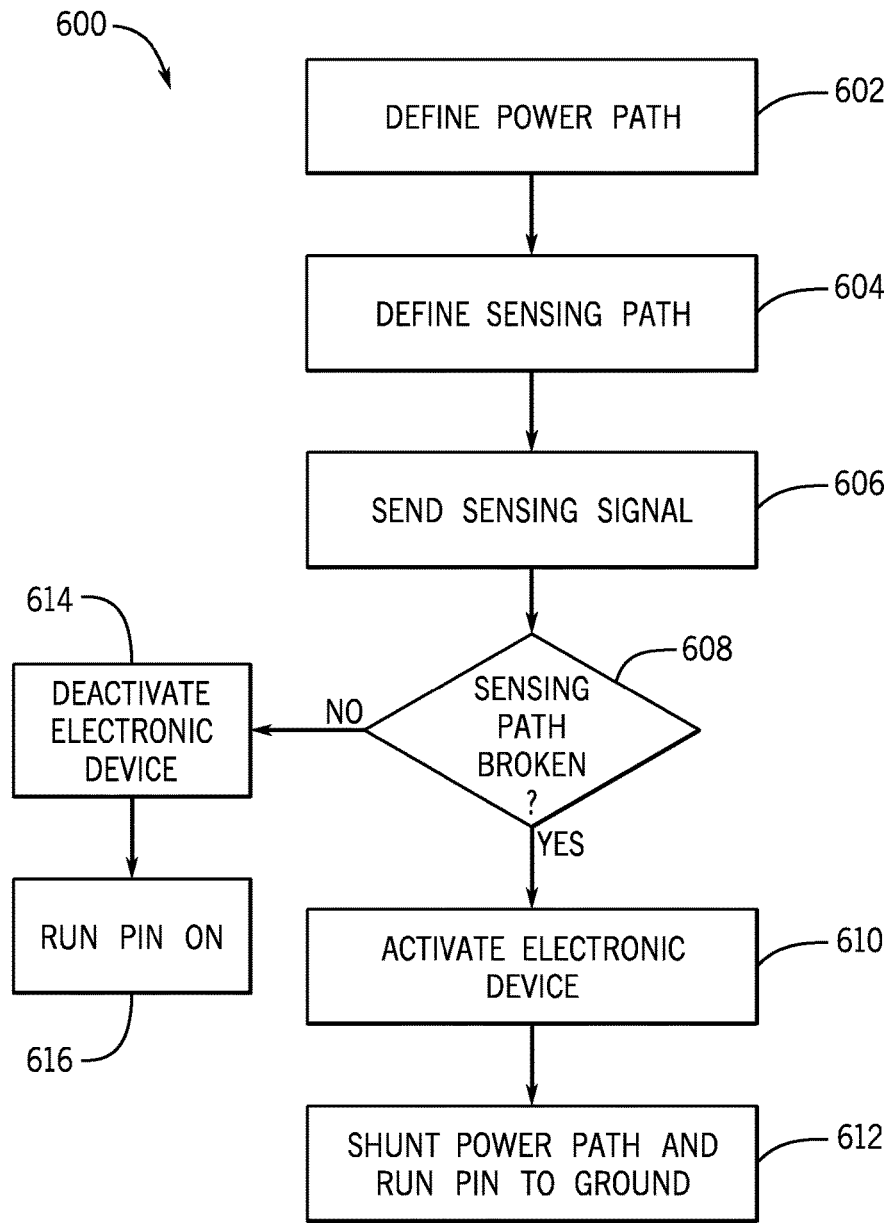
FIG. 6 is a flowchart for a method for controlling voltage for one or more components of a gaming system based on detection of one or more connector/port pair(s) interfacing between two computer boards of the gaming system according to another embodiment of the present invention.

In another embodiment of the invention, a process is described in FIG. 6 corresponding to a generalized methodology of controlling voltage to components of a gaming system, based on detection of one or more properly coupled connector/port pairs between a computer board and the backplane of a gaming system in accordance with the disclosed concepts of the invention. As an example, elements from FIG. 4 will be used to provide context for the generalized discussion of the method of FIG. 6.

Process 600 begins when power is applied to the system (for example at initial boot up, or system initialization, or alternatively when initiated by an authorized user), where the system contains the required functional elements, for example, a primary board (for example, central processing unit baseboard), backplane, etc. A power path (for example, power path 448) is defined for distributing power to the one or more components on a circuit board of the gaming system (for example, controller 440), along with an electrical ground (step 602). This power path ultimately controls voltage to the one or more elements of the gaming system based on detection of one or more properly seated connector/port pairs of a computer board and backplane of the gaming system (for example, backplane 410 and primary baseboard 420).

A sensing path is defined (for example, sensing path 460), comprising a set of port/connector pairs (step 604) (for example, connector/port pairs 411/421, 412/422, and 413/423, although any number of port/connector pairs may be specified, including only a single port/connector pair). Each respective port/connector element is specifically configured to mate with a corresponding port/connector element, and serves to connect a circuit board (for example, primary board 420) to another board (for example, backplane 410). A sensing signal is sent along the defined sensing path (step 606) in order to determine if the sensing path is broken (step 608).

When the sensing path is determined to be broken (for example, one of the backplane 410 and primary baseboard 420 port/connector pair(s) are not properly coupled), an electronic device (for example, electronic device 450) is activated (step 610), and the power intended for propagation on the defined power path (for example, RUN pin 442 of controller 440 via power path 448) is shunted to ground (step 612).

When the sensing path is determined not to be broken (for example, all of the port/connector pair(s) are properly coupled between primary baseboard 420 and backplane 410), the electronic device is deactivated (step 614), and power is provided to the power path for propagation (step 616) (for example, power is sent along path 448, that is, execution of step 616 relates to voltage being propagated to RUN pin 442 of controller 440).

Figure 7:
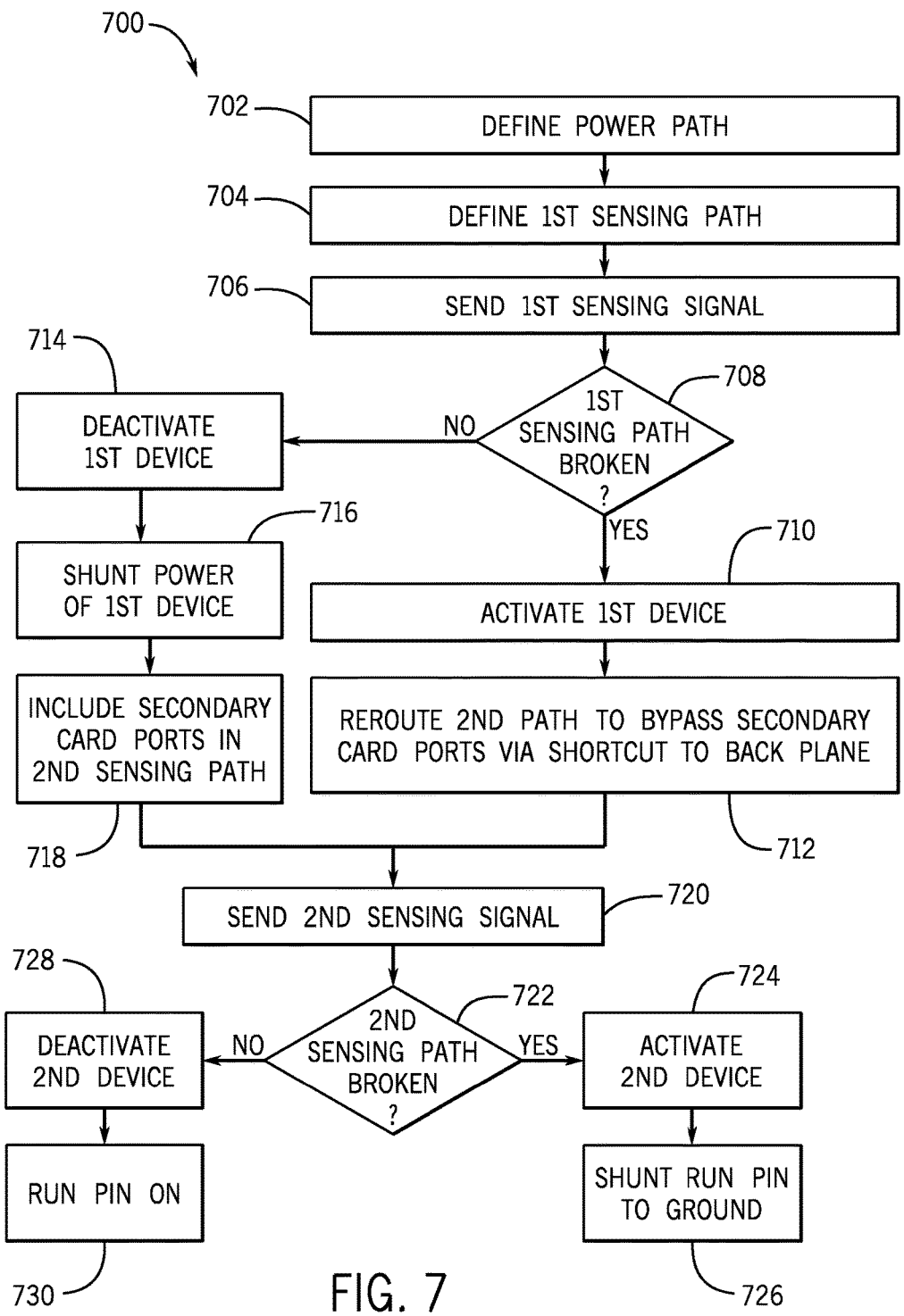
FIG. 7 is a flowchart for a method for controlling voltage for one or more components of a gaming system based on detection of one or more properly seated computer boards of the gaming system according to another embodiment of the present invention.

In another embodiment of the invention, a process is described in FIG. 7 corresponding to a generalized methodology of controlling voltage to components of a gaming system, based on detection of one or more properly seated computer boards of the gaming system in accordance with the disclosed concepts of the invention. As an example, elements from FIG. 5 will be used to provide context for the generalized discussion of the method of FIG. 7.

Process 700 begins when power is applied to the system (for example at initial boot up, or system initialization, or alternatively when initiated by an authorized user), where the system contains the required functional elements, for example, a primary board (for example, central processing unit baseboard), backplane, etc. A power path is defined for distributing power to the one or more components on a circuit board of the gaming system (for example, power path 548), along with an electrical ground (for example, ground 544) (step 702). This power path ultimately controls voltage to the one or more elements of the gaming system (for example, controller 540) based on detection of one or more properly seated computer boards of the gaming system. A first sensing path (for example sensing path 562) is defined, comprising a set of first port/connector pairs (step 704). Each respective first port/connector element is specifically configured to mate with a corresponding first port/connector element, and serves to connect a given board (for example, primary board 520) to another board (for example, secondary board 530). A first sensing signal is sent along the first sensing path (step 706) in order to determine if the first sensing path is broken (step 708).

If the first sensing path is determined to be broken (i.e., primary board 520 and secondary board 530 are not properly coupled), a first electronic device is activated (step 710), and a second sensing path is defined (for example, sensing path 561) which bypasses the first port/connector pairs and one or more second port/connector pairs (step 712). For example, execution of step 712 relates to the port/connector pair(s) which couple primary board 520 to secondary board 530 (i.e., first port/connector pairs), along with the interface of secondary board 530 to the backplane 510 (i.e., second port pairs), being omitted from the second sensing path; this omission occurs because the secondary board is either improperly connected to the primary board, or absent.

If the first sensing path is determined not to be broken (for example, primary board 520 and secondary board 530 are properly connected), the first electronic device is deactivated (step 714), signaling of the first sensing path is shunted to ground (step 716), and the first and second port/connector pairs (for example, primary board 520 to secondary board 530, and secondary board 530 to backplane 510) are included in the second sensing, path (step 718).

For example, step 718 occurs to ensure that secondary board 530 (when properly connected to primary board 520) is tested for proper connectivity to backplane 510. Thus, the second sensing path in this example traverses all the existing (determinable) port/connector pairs to ensure that power is riot forwarded to components when there is improper coupling of any of the interfaces. For example, in the event that secondary board 530 is properly connected to primary board 520, the second sensing path verifies all available port/connection pairs of both boards to ensure integrity, and if secondary board 530 is improperly connected to primary board 520, there exists no need to verify that secondary board is properly coupled to backplane 510, and only the connector/port pairs between the primary board and backplane should be verified.

In step 720, a second sensing signal is sent along the second sensing path to ultimately determine whether the second sensing path is broken (step 722). If the second sensing path is determined to be broken, i.e., one of the port/connector pairs along the defined second sensing path are not properly seated or connected, the second electronic device is activated (step 724) and the power intended for propagation on the power path is shunted to ground (step 726).

For example, the execution of step 726 specifically indicates that with or without primary board 520 being connected to secondary board 530, either port/connector pair 511/531 (connecting the secondary board 530 to the backplane 510), and/or one of the port/connector pairs 512/522 or 513/523 (connecting the CPU board 520 to the backplane 510), must be improperly seated. Thus, power to the one or more components on the circuit board of the gaming system (e.g., controller 540) is shunted to ground, and these component(s) are not subjected to power via power path 548. If the second sensing path is determined not to be broken, i.e., all of the port/connector pairs along the defined second sensing path are properly seated/connected, the second electronic device is deactivated (step 728) and power is provided to the power path for propagation (step 730). For example, execution of step 728 relates to voltage being propagated to RUN pin 542 of controller 540 via power path 548 to activate controller 540.

For example, the execution of step 730 specifically indicates that with or without secondary board 530 being connected to primary board 520, all existing pair/connector pairs, including port/Connector pair(s) 511/521 (connecting secondary board 530 to backplane 510) when secondary board 530 is connected to primary board 520, and both of the port/connector pairs 512/522 and 513/523 (coupling the primary board 520 to the backplane 510), are all properly seated. Thus, power to the one or more components on the circuit board of the gaming system is granted, via propagated power via the defined power path 548. This situation will only occur when all the critical port/connector pairs are properly connected, and components will not be damaged by applying voltage to components which may have improperly seated or connected components.

While each set (pair) of respective ports and connectors are specifically designed to mate together; that is, a given port/connector element (for example, port 512 is configured to mate with a respective port/connector element (in this case, connector 522), which is specifically designed to match the port precisely to enable signal and voltage transfer through the port/connector pair. As will be appreciated by those skilled in the art, a variety of differing embodiments (including different port/connector purposes and system component combinations), which are reasonably and logically equivalent are intended to be included in the present description of the invention.

In any and all the prior embodiments, the connection/port pairs which connect boards of gaming system 10, 400, or 500, are not limited to a single pair, nor to any specific type or configuration of coupling device. A skilled artisan can recognize that a single logical port/connector pair as employed in this description be realized by a number of serialized port/connector pairs which collectively act as a single port. That is, if one of an arbitrary number of ports, which are connected in series, is improperly coupled, the entire string of port/connector pairs comprising the logical port/connector is improperly coupled (i.e., broken). Thus, any number of port/connector pairs may comprise a singly recited port/connection element. Further, a variety of differing embodiments (including different port/connector purposes, system component combinations, purposes/functions performed by specific boards, etc.) does not depart from the spirit of the invention, as an artisan skilled in the art would readily recognize. This includes the provision for a given board (or set of boards) to have practically any configuration or number of coupling devices to transfer data signals and/or voltage to other connected board(s) and still be applicable to the present invention.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system operable to control voltage comprising:
   a backplane board comprising a power port and one or more additional ports, the power port being configured for supplying power to one or more components of the gaming system;

a primary board comprising a power path and one or more connectors, the power path being coupled to the power port and configured for supplying power to at least one primary board component on the primary board and each of the one or more connectors being configured to couple with a corresponding one of the one or more additional ports;

an electronic device controlling the flow of power through the power path; and a sensing path traversing the backplane board, the primary board via the one or more additional ports, and the electronic device, and having unimpeded access to a connection to ground of the primary board, in response to the one or more additional ports and the respective one or more connectors being properly coupled, wherein:

the electronic device is deactivated to provide power to the at least one primary board component in response to all of the one or more connectors being properly coupled with the corresponding one or more ports; and the electronic device is activated to shunt the power path to the connection to ground of the primary board in response to any of one or more additional connectors being improperly coupled to the corresponding one or more ports.

2. The gaming system of claim 1, wherein the electronic device is coupled directly to the sensing path, the connection to ground of the primary board, and an activation pin of a power controller.

3. The gaming system of claim 1, wherein the electronic device is a field effect transistor (FET).

4. A gaming system operable to control voltage comprising:

a backplane board comprising a power port, one or more primary backplane ports, and one or more secondary backplane ports, the power port being configured for supplying power to one or more components of the gaming system; and a primary board comprising a power path, one or more primary backplane connectors, and a secondary port, the power path configured for supplying power to at least one primary board component, and each of the one or more primary backplane connectors configured to couple with a corresponding one of the one or more primary backplane ports forming corresponding one or more primary backplane port/connector pairs; and a secondary board comprising a secondary connector and one or more secondary backplane connectors, the secondary connector configured to couple with the secondary port forming a secondary port/connector pair, and the one or more secondary backplane connectors configured to couple with a corresponding one of the one or more secondary backplane ports forming corresponding one or more secondary backplane port/connector pairs;

a first electronic device controlling the flow of power through the power path; and a first sensing path traversing the backplane board, the primary board via the one or more primary backplane ports, and the first electronic device, and having unimpeded access to a connection to ground of the primary board, wherein:

the first electronic device is deactivated to provide power to the at least one primary board component in response to all of the one or more primary backplane port/connector pairs being properly coupled; and the first electronic device is activated to shunt the power path to the connection to ground of the primary board in response to any of the one or more primary backplane port/connector pairs being improperly coupled.

5. The gaming system of claim 4, wherein the at least one primary board component includes a controller supplying power to other primary board components.

6. The gaming system of claim 4, wherein, in response to the primary board, the secondary board, and the backplane board of the gaming system being all properly coupled, the first sensing path traverses the first electronic device, the one or more primary backplane port/connector pairs, the one or more secondary backplane port/connector pairs, and the secondary port/connector pair.

7. The gaming system of claim 4, further comprising:

in response to the secondary port/connector pair being properly coupled, a secondary board sensing path traverses the primary board and the secondary board via the secondary port/connector pair; and a second electronic device coupled to the secondary board sensing path, wherein in response to the secondary port/connector pair being properly coupled, the secondary board sensing path performs loopback through the secondary port/connector pair and terminates at the ground of the primary board.

8. The gaming system of claim 7, wherein the second electronic device is positioned on the primary board.

9. The gaming system of claim 7, wherein the second electronic device is positioned on the secondary board.

10. The gaming system of claim 7, wherein in response to the secondary port/connector pair being improperly coupled, the second electronic device is activated causing the first sensing path to traverse the second electronic device and bypass the secondary port/connector pair and the one or more secondary backplane connectors.

11. The gaming system of claim 7, wherein in response to the secondary port/connector pair being properly coupled, the second electronic device is deactivated causing the first sensing path to further traverse the secondary port/connector pair and the one or more secondary backplane connectors.

12. The gaming system of claim 11, wherein in response to the one or more secondary backplane port/connector pairs being improperly coupled, the first electronic device is activated causing the power path to be shunted to the ground of the primary board.

13. The gaming system of claim 7, wherein the first and second electronic device are field effect transistor (FETs) devices.

14. The gaming system of claim 7, wherein in response to the secondary port/connector pair being properly coupled, the second sensing path traverses the secondary port/connector pair, terminating at connection to ground of the primary board.

15. A method of controlling voltage in a gaming system comprising:

establishing a power path for supplying power to one or more components on a circuit board of the gaming system or an electrical ground of the circuit board of the gaming system, wherein an electronic device controls a flow of power through the power path;

establishing a first sensing path comprising one or more first connectors and a corresponding number of one or more first ports, wherein each of the one or more first connectors is configured to couple with a corresponding one of the one or more first ports forming corresponding one or more first port/connector pairs;

sending a first sensing signal via the first sensing path to determine whether all of the one or more first port/connector pairs are properly coupled; and in response to all of the first port/connector pairs being properly connected:

deactivating a first electronic device, thereby configuring the first sensing path to traverse the one or more first port/connector pairs, and shunt the first sensing signal to the electrical ground of the circuit board; and establishing a second sensing path, comprising the one or more first port/connector pairs, one or more second connectors and a corresponding number of second ports forming corresponding one or more second port/connector pairs, and one or more third connectors and a corresponding number of third ports forming corresponding one or more third port/connector pairs.

16. The method of controlling voltage set forth in claim 14, wherein in response to any of the one or more first port/connector pairs being improperly coupled, the method further comprising:

activating the first electronic device, thereby configuring the second sensing path to traverse the first electronic device, and the one or more third port/connector pairs, bypassing the one or more first port/connector pairs and the one or more second port/connector pairs.

17. The method of controlling voltage set forth in claim 16, further comprising sending a second sensing signal via the second sensing path to determine whether the second sensing path is continuous.

18. The method of controlling voltage set forth in claim 17, further comprising in response to a determination that the second sensing path is continuous, deactivating the second electronic device and providing power to the one or more components on the circuit board.

19. The method of controlling voltage set forth in claim 17, further comprising in response to a determination that the second sensing path is not continuous, activating the second electronic device to shunt the power for the one or more components on the circuit board to the electrical ground.

* * * * *